May 29, 1962 P. P. C. VIGNERON 3,036,372
APPARATUS FOR POSITIONING AND ASSEMBLING PIPE ELEMENTS
Filed May 21, 1958 3 Sheets-Sheet 3
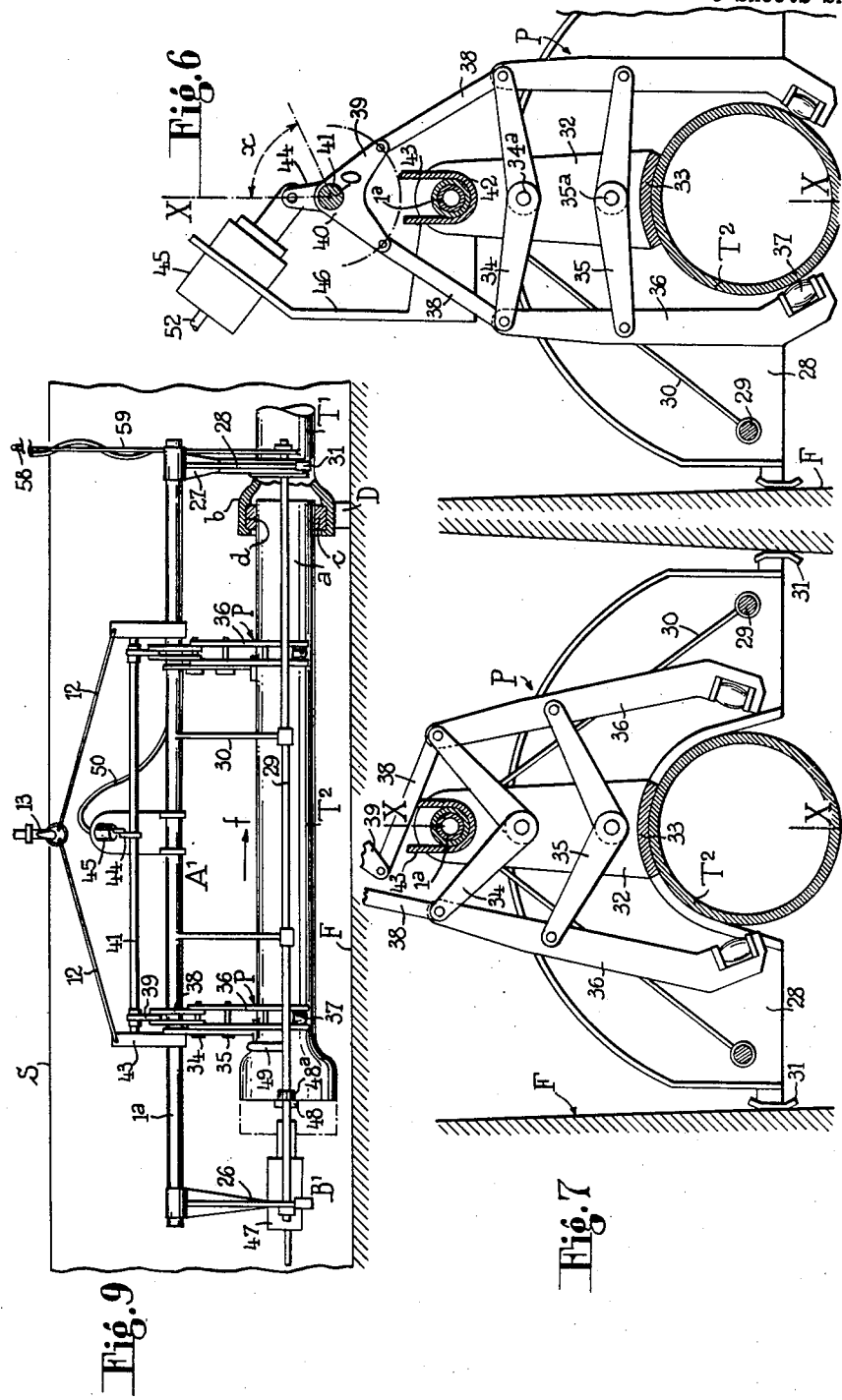

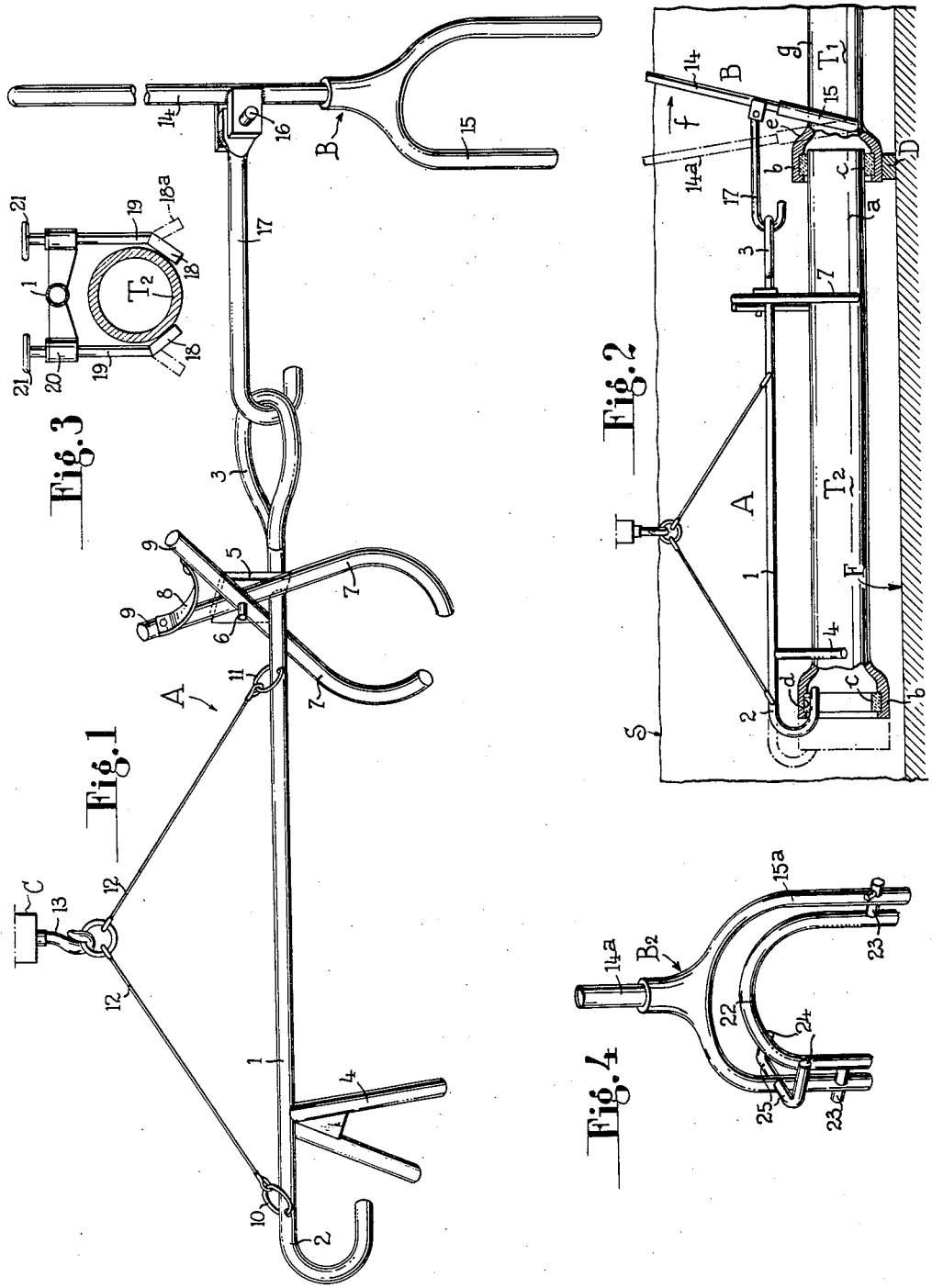

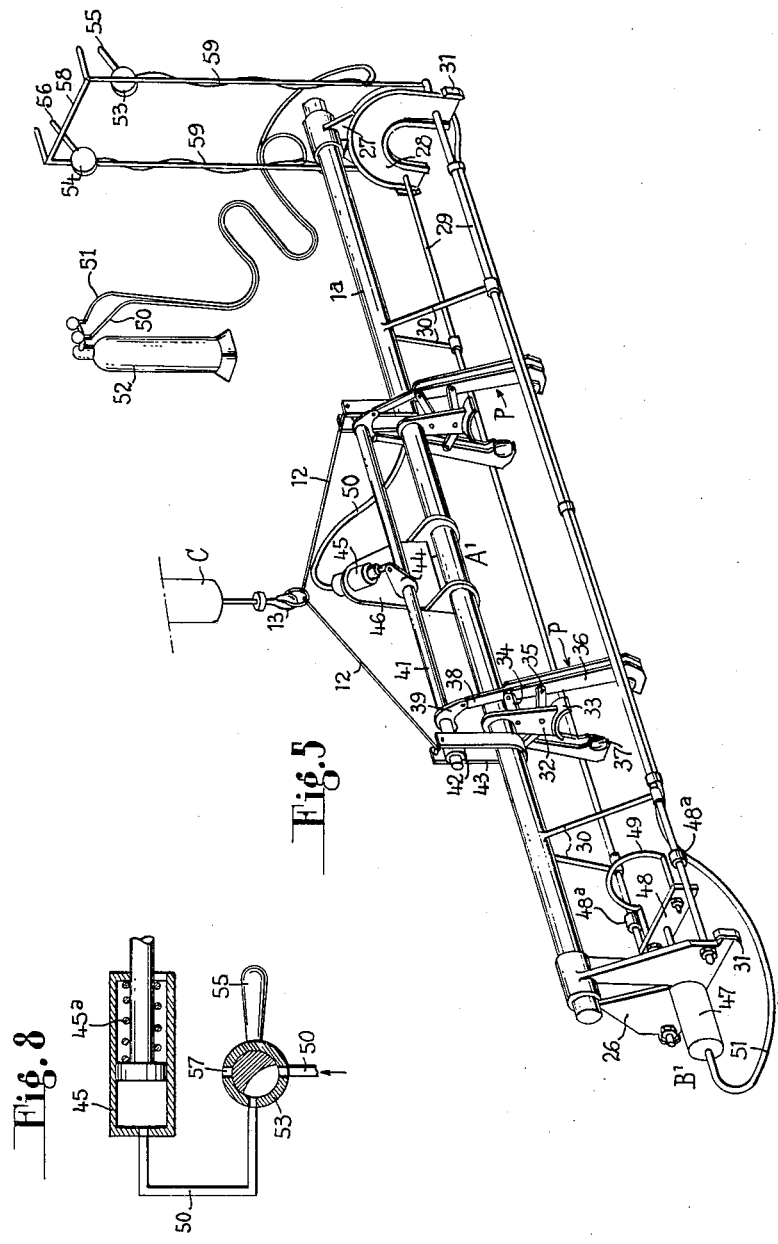

3,036,372
APPARATUS FOR POSITIONING AND ASSEMBLING PIPE ELEMENTS
Pierre Paul Camille Vigneron, Nomeny, France, assignor to Compagnie de Pont-a-Mousson, Nancy, France, a French body corporate
Filed May 21, 1958, Ser. No. 736,840
Claims priority, application France June 5, 1957
6 Claims. (Cl. 29—237)

The present invention relates to the laying of pipe lines composed of pipes or like elements having socket and male or bell and spigot ends assembled by forcing the male end of one pipe element into the flexible and elastic sealing ring previously placed in the socket of the adjoining pipe element.

An object of the invention is to provide an apparatus of very simple construction which is very easy to use for positioning and assembling a pipe with an adjacent pipe which has already been laid in a fixed position.

The apparatus of the invention comprises in combination a handling device for handling a first pipe adapted to permit moving the first pipe vertically by means of its suspension from hoisting means and then transmitting to the first pipe a longitudinal force on the end of the socket of the first pipe, and an actuating device adapted to exert said longitudinal force by bearing against a second adjacent pipe previously laid for engaging the male end of the first pipe in the socket of the second pipe.

Further features and advantages of the invention will be apparent from the ensuing description, with reference to the accompanying drawings, to which the invention is in no way restricted.

In the drawings:

FIG. 1 is a perspective view of an apparatus embodying the invention;

FIG. 2 is a diagrammatic view of a pipe laid by means of said apparatus;

FIG. 3 is a cross-sectional view of a modification of the support means of the handling device;

FIG. 4 is a partial perspective view of a modification of the actuating device;

FIG. 5 is a perspective view of another apparatus embodying the invention;

FIG. 6 is a cross-sectional view of one of the clamps of the apparatus shown in FIG. 5, in its closed position;

FIG. 7 is a similar view of the clamp in its open position;

FIG. 8 is a diagrammatic sectional view of a control device for a ram of the apparatus shown in FIG. 5, and FIG. 9 is a diagrammatic elevational view of the apparatus in the course of laying a pipe.

In the embodiment shown in FIGS. 1 and 2, the apparatus comprises a handling and force transmitting device A and an actuating or operating device B adapted to provide said force in the form of an axial traction.

The handling device A comprises a bar 1 whose length corresponds substantially to that of the pipes to be laid. This bar is bent in the form of a hook 2 at one end and a loop 3 at the other end. A V-shaped guide means 4 whose branches are downwardly divergent is fixed to the bar near the hook 2.

Near the loop 3, the bar 1 carries a plate 5 fixed thereto by welding or other means. Pivotably mounted on the plate by a journal 6 parallel with the bar 1 is a clamp having jaws 7 which are capable of pivoting in a plane perpendicular to the bar and are normally urged toward one another by a spring 8 compressed between the levers 9 which upwardly extend the jaws 7.

Fixed to the bar 1, near the ends thereof, are two rings 10 and 11 to which are attached sling elements 12 which suspend the device A from a hook 13 of hoisting means C of any type.

The actuating device B, which complements the device A, comprises a lever 14 extended by a yoke 15. Pivoted to the lever at 16 near the yoke 15 and contained in a plane perpendicular to the plane of the yoke is a hook 17 adapted to be engaged in a detachable manner in the loop 3 of the device A.

The apparatus operates in the following manner:

Let it be supposed that a pipe $T_2$ is to be assembled with a pipe $T_1$ (FIG. 2), the pipe $T_1$ having been already laid on the bottom of the trench F on blocks D and constituting the temporary end of a laid pipe line.

Each of these pipes comprises a male end of spigot $a$ and a socket or bell $b$ in which latter is disposed, before assemblage of the pipes, a sealing ring $c$ preferably engaged in a recess $d$ in the inner face of the socket.

The pipe $T_2$ is lifted off by the ground S by the device A whose hook 2 is introduced in the socket $b$ with the aid of the guide member 4, whereas the jaws 7 are closed round the rest of the pipe in such manner as to support the latter. The pipe $T_2$ suspended by the device A from the hook 13 of the hoisting means C is then lowered onto the bottom of the trench F in which is disposed the section of the pipe line already laid and in particular the last pipe $T_1$, which could of course be the first pipe laid.

The pipe $T_2$ is positioned in front of the pipe $T_1$ coaxially of the latter and is then moved toward the pipe $T_1$ by the operator in such manner as to introduce its male end $a$ into the socket $b$ of the pipe $T_1$ until the end of the male end encounters the sealing ring $c$ previously placed in the socket $b$. The actuating device B is then placed on the part $g$ of the pipe $T_1$, its yoke 15 bearing against the shoulder $e$ between the outer face of the socket $b$ and the part $g$, and the hook 17 being turned toward the pipe $T_2$.

The lever 14 is urged toward the pipe $T_2$ so as to assume the position 14$a$ shown in dot-dash line and the hook 17, thus brought nearer the pipe $T_2$, is engaged in the loop 3 of the device A. The lever 14 is then urged in the direction of arrow $f$ so as to shift the pipe $T_2$ toward the pipe $T_1$, the male end $a$ of the pipe $T_2$ entering the ring $c$ of the socket $b$ of the pipe $T_1$.

The hook 2 which supports the pipe $T_1$ in co-operation with the jaws 7 also constitutes an abutment for the end of the socket $b$ of the pipe $T_2$ and transmits, in the form of a thrust in a direction from the pipe $T_2$ toward the pipe $T_1$, the traction exerted on the bar 1 by the lever 14. The length of the latter depends on the tractive force necessary for overcoming the resistance to penetration of the sealing ring $c$, which resistance varies in accordance with the type of joint and the pipe diameters.

The pipes $T_1$ and $T_2$ are thus rapidly assembled. The device B is then unhooked from the device A and removed from the pipe $T_1$. After blocks have been placed under the pipe $T_2$, the jaws 7 are opened and the device A is removed from the pipe $T_2$ and raised to the surface in readiness for taking hold of the next pipe to be laid.

The same procedure is adopted for the following pipe to be placed in position and assembled with the pipe $T_2$, and so on, until the entire pipe line has been laid in the trench.

It will be observed that the apparatus of the invention permits grouping in a single operation the handling of the pipe $T_2$ to be laid and its assemblage with the part of the pipe line already laid while this pipe $T_2$ is still suspended and is therefore easily moved. Moreover, the apparatus permits laying pipes in all types of ground and even on the slope.

In a modification of the invention, shown in FIG. 3, the support means for the part of the pipe $T_2$ remote from the socket $b$ consists of a pair of hooks 18 which are rigid with rods 19 held parallel with one another by a cross-member 20 rigid with the bar 1, the distance between these rods being slightly greater than the diameter of the part $a$ of the pipe $T_2$. The rods 19 are capable of rotating on their axes and are provided for this purpose with adjusting wheels 21 which permit turning the hooks 18 toward one another as shown in full line in FIG. 3 for supporting the pipe $T_1$ or outwardly away from one another in the second position shown in dot-dash line, in which position they no longer support the pipe. The hooks are placed in the second position when placing the device A on the pipe $T_2$.

FIG. 4 shows a modification $B_2$ of the actuating device. The latter comprises an auxiliary yoke 22, the distance between the branches thereof corresponding to the diameter of the part $g$ of the pipe to be laid. It is adapted to bear against the shoulder $e$ (FIG. 2) between the part $g$ and the outer wall of the socket $b$ of the pipe. This auxiliary yoke 22 is mounted within a second main yoke 15a rigid with the operating lever 14a and is pivoted to the yoke 15a by a pair of journals 23.

The yoke 22 is maintained inside the yoke 15a at least during the positioning of the device $B_2$ on the pipe already laid, such as the pipe $T_1$ (FIG. 2) by means of a pair of retractable abutments 24 pivotably mounted on the yoke 15a by a common portion 25. Owing to the action of these abutments 24, which limit the pivotal movements of the yoke 22, the latter presents its concave side to the pipe $T_1$.

This modification $B_2$ of the actuating device has the following advantage over the first-described device B. The auxiliary yoke 22 bearing on the pipe $T_1$ in the course of pipe assembly does not participate in the pivotal movements of the lever 14a owing to the free movements permitted by the abutments 24, and this avoids any rubbing against the pipe $T_1$ and facilitates assemblage.

In the embodiment shown in FIGS. 5 to 7, the apparatus comprises in combination, a handling device $A_1$ for the pipe $T_2$ to be laid and an actuating device $B_1$.

The device $A_1$ comprises a tubular support or bar 1a whose length substantially corresponds to that of the pipe $T_2$ plus that of a socket of the pipe $T_2$. Fixed at one end is a bracket 26 supporting the actuating device $B_1$ whereas at the other end there is fixed a bracket 27 supporting a horseshoe-shaped rigid yoke 28 contained in a plane perpendicular to the axis of the support 1a. The bracket 26 and the yoke 28 are interconnected by a pair of rods 29 which form with the support 1a the corners of a right prism whose base is an isosceles triangle. To improve the rigidity of this structure, intermediate bracing members 30 connect the support 1a to each of the rods 29. Further, the structure is provided with two pairs of guide pads 31 in the form of small skis perpendicular to the rods 29 and fixed to the yoke 28 and bracket 26.

Fixed to the middle portion of the support 1a are two brackets 32 which support self-clamping clamps P. Welded to the lower part of the bracket 32 are guide supports 33 for the pipe $T_2$ in the form of arcuate members. Pivoted at 34a and 35a on each of the brackets 32 and disposed on the vertical axis X—X intersecting the axis of the support 1a are the ends of a pair of upper links 34 and a pair of lower links 35 respectively. The free ends of the upper links 34 are pivoted to the upper ends of the jaws 36 of the clamps, whereas the free ends of the lower links 35 are pivoted to the mid-part of the jaws 36.

Mounted at the lower end of each jaw 36 is a roller 37 whose axis is perpendicular to the support 1a so that the roller 37 adapted to support the pipe T is capable of rolling along the latter. The upper ends of the jaws 36 are also connected by two connecting rods 38 to the free ends of two equal branches of a bell crank 39 whose apex is rigid, as concerns rotation, with a bar 41 parallel with the support 1a and supported at each end by a bearing 42 fixed to a member 43 rigid with the support 1a. The bar 41 is thus supported by the support 1a and is capable of being rotated about its axis in the bearings 42, and thus causing simultaneous rotation of the two bell cranks 39, under the effect of a lever 44 fixed to the mid-part of the bar 41 and pivoted to the end of the rod of a piston of a single-acting air jack 45 which is fixed to a bracket 46 rigid with the support 1a. The members 43 which support the control rod 41 controlling the jaws and are rigid with the support 1a, are hooked on the ends of two sling elements or rods 12 suspending the device $A_1$ from the hook 13 of hoisting means C.

The actuating device $B_1$, which is complementary to the device $A_1$, is formed of a single-acting pneumatic jack 47 fixed as mentioned hereinbefore to the bracket 26 of the device $A_1$ in such manner that its axis, which is parallel with the axis of the support $A_1$, is in the prolongation of that of the pipe $T_2$. The rod of the piston of the ram 47 carries at its end a thrust plate 48. The latter consists of a flat piece of metal whose length is equal to at least the outside diameter of the socket of the pipe $T_2$. It is guided, in the course of the movements imparted thereto by the ram 47, by the rods 29 on which it is supported and its travel is limited by abutment collars 48a fixed on the rods 29. Fixed to the plate 48 is a yoke 49 adapted to cap the plane part of the pipe $T_2$ adjacent the start of the socket portion so as to form between the latter and the plate 48 a housing for this portion.

The jack 45 actuating the control bar 41 is connected to a pipe 50 (FIGS. 5, 8 and 9) supplying compressed air. Similarly, the jacks 47 are connected to a compressed air supply pipe 51. The air for operating the jacks 45 and 47 is supplied to the latter by a source of air of any type, for example an air cylinder 52, by way of the pipes 50 and 51. Mounted in series in these pipes are three-way cocks 53 and 54 respectively actuated by levers 55 and 56, one of the ways being formed by the part of the pipe 50 (or 51) connected to the cylinder of the jack 45 (or 47), another way by the part of the pipe 50 (or 51) connected to the compressed air source 52, and the third way by an aperture, such as an exhaust aperture 57 (FIG. 8).

The apparatus is completed by a shifting handle 58 fixed to the yoke 28 by two parallel uprights 59 perpendicular to the axis of the support 1a, said handle carrying the levers 55 and 56 controlling the cocks 53 and 54. The handle enables an operator on the surface level of the ground to impart to the apparatus the required direction for lowering it into the trench F (FIG. 9) and actuate the jacks of the clamps and thrust plate.

The apparatus operates in the following manner:

Let it be supposed that a pipe $T_2$ is to be assembled with or inserted in a pipe $T_1$ (FIG. 9) which is already positioned on the bottom of the trench F on blocks D and constitutes the last pipe of a series of pipes of a laid pipe line.

The operator takes hold of the handle 58 and actuates the lever 55 controlling the jaws so as to admit compressed air into the jack 45. The piston of the latter moves and turns the lever 44, the control bar 41 and the two bell cranks 39 (FIG. 6). The connecting rods 38 are moved by this movement of rotation about the centre O through an angle $x$ so that the upper ends of the jaws 36 of the clamps P are raised and moved toward the vertical plane containing the axis of the support $1a$ whereas the pivotal connection of the lower links 35 on the jaws are moved toward said vertical plane to a lesser extent. The jaws 36 of the clamps P are therefore opened (FIG. 7).

After this preparation of the apparatus, the operator, assisted by the hoisting means C (FIG. 5), places the socket of the pipe $T_2$ resting on the ground surface S (FIG. 9) between the plate 48 and the yoke 49, he then actuates the lever 55 to connect the jack 45 to its corresponding exhaust aperture 57 and the piston of the jack 45 is urged by a return spring $45a$ (FIG. 8) to its initial position and moves the control rod 41 and the levers and connecting rods controlling the jaws 36 (FIG. 6) to their initial positions. The jaws are therefore moved toward the pipe $T_2$. When the hook 13 raises the apparatus, the latter raises the pipe $T_2$, since the jaws 36 of the clamps P clamp round the pipe under the effect of the weight of the latter. The pipe $T_2$ is therefore suspended by the device $A_1$ from the hook 13 of the hoisting means C and is lowered into the trench F where the last section of the pipe line, that is, the pipe $T_1$, is already in position.

Owing to the guide pads 31 bearing against the vertical walls of the trench F, the pipe $T_2$ while remaining suspended is easily placed coaxially of the pipe $T_1$, the descent of the latter having been guided in the same manner (FIG. 9). The operator shifts the handle 58 in the direction to move the pipe $T_2$ toward the pipe $T_1$ so as to place the yoke 28 of the apparatus on the start of the socket portion of the pipe $T_1$, and bring the male end $a$ of the pipe $T_2$ into coaxial alignment with the pipe $T_1$. Then he actuates the lever 56 of the jack 47 so as to admit compressed air into the latter. The piston of the jack 47 then shifts the plate 48 which exerts an axial thrust on the end of the pipe $T_2$ corresponding to the socket of this pipe—the apparatus being supported against the part connecting the socket $b$ to the rest of the pipe $T_1$—through the medium of the rods 29 and the yoke 28. The pipe $T_2$ moves in the direction of arrow $f$ (FIG. 9) along the rollers 37 of the clamps and the male end $a$ of this pipe $T_2$ enters the sealing ring $c$, previously disposed inside the socket $b$ of the pipe $T_1$, until the plate 48 encounters the abutments $48a$.

During this stage of the operation, the device $A_1$ remains fixed in position and the pipe $T_2$ is continuously guided by the rollers 37 coaxially of the pipe $T_1$. As the pipe is also subjected to an axial thrust, it is perfectly centered in the ring $c$ which facilitates its penetration and avoids any deterioration or displacement of the ring. The pipes $T_1$ and $T_2$ are thus rapidly assembled.

The operator then places a block under the pipe $T_2$ and he actuates once more the lever 55 to admit compressed air into the jack 45 and thus open the clamps P. The apparatus is raised out of the trench. The operator then actuates the lever 56 so as to connect the jack 47 to the corresponding exhaust aperture of the cock 54 and the piston of the jack 47 returns, under the effect of its return spring, the plate 48 to its initial position. The apparatus is then ready to take hold of the following pipe to be laid for assembly with the pipe $T_2$, and so on, until the entire pipe line has been laid in the trench.

As can be seen, the apparatus shown in FIGS. 5–6 permits grouping into a single operation, the handling of the pipe $T_2$ to be laid and its assemblage with the part of the pipe line already in position, while this pipe $T_2$ is still suspended and in consequence easily positioned.

Although simple and strong, the apparatus has no tendency to harm the outer surface of the pipes, since there is no rubbing against the surface when taking hold of the pipe or during its assembly with the previously-laid pipe. Further, the pipe is laid at a very high speed and in a very regular manner owing to the precision of the handling due to the fact that the apparatus is provided with guide means permitting its immediate adaptation to the pipe to be taken hold of and the guiding of the pipe in the course of its descent into the trench and its positioning in front of the previously laid pipe, these guide means eliminating any unnecessary movement and thus any loss of time. Owing to the mechanical, pneumatic or hydraulic means employed replacing manual labour, human energy expended is reduced to a minimum. This apparatus is therefore particularly advantageous in the laying of pipe lines of great length having numerous joints.

The apparatus permits laying pipe lines in any type of ground and even on the slope. Thus, owing to the yoke 49, which constitutes safety means, the pipe $T_2$ is retained in position should there be a steep inclination in the direction from the socket toward the male end of this pipe, which has a tendency to cause movement of the pipe along the rollers 37 in a direction away from the plate 48 and its escape from the apparatus.

Although specific embodiments of the invention have been described, many modifications and changes may be made therein without departing from the scope of the invention as defined in the appended claims. Thus, in the embodiment shown in FIGS. 5–9, the lever 55 controlling the jaws could be placed on the hoisting means and the source of compressed air could be a compressor. The rams could also operate hydraulically.

Having described my invention what I claim as new and desire to secure by Letters Patent is:

1. Apparatus for positioning a first pipe having a socket end and a male end and assembling the pipe by means of a connector of the pushing type with a similar adjacent second pipe already fixed in position, said apparatus comprising in combination: hoisting means, a longitudinal support including a beam, an actuating device fixed to said beam at one end thereof and adapted to exert an axial thrust directly on the end of the socket of the first pipe to engage the male end of the first pipe in the socket end of the second pipe by bearing against said beam, a yoke coupled to the other end of said beam and adapted to bear against the outer face of the shoulder connecting the socket end and the body of the second pipe for transmitting thereto the longitudinal force exerted on said beam by said actuating device, two openable and self-closing clamps operably coupled to said beam between the ends thereof adapted to support the first pipe to handle and guide it for translation parallel with said beam in the course of positioning the first pipe, a raised handle-bar for handling said apparatus operatively associated with said other end of said beam, remote-control means on said handle-bar for controlling said clamps and said actuating device, and at least one suspension member which is located at the upper part of said beam and suspends said support from the hoisting means.

2. Apparatus according to claim 1, wherein said actuating device comprises a jack including a body portion and a movable member, said body portion being fixed to said beam, and including a thrust plate coupled to said movable member adapted to bear against said first pipe during positioning thereof.

3. Apparatus according to claim 2, wherein said longitudinal support includes two tie rods parallel with said beam and forming therewith the edges of a geometric triangular-base prism, said beam and said tie rods connecting the body portion of said jack to said yoke.

4. Apparatus according to claim 3, wherein said longitudinal support includes guide pads, said guide pads being positioned on the outer perimeter of said longitudinal support and being adapted to bear against the vertical walls of a trench to orient the first pipe in a direction parallel with the axis of the trench in which the first pipe is to be positioned.

5. Apparatus as claimed in claim 1, wherein said actuating device comprises an element for retaining the first pipe for prevention thereof from moving on sloping terrain by itself toward the second pipe by moving away from said actuating device.

6. Apparatus as claimed in claim 5, wherein the actuating device comprises a thrust plate adapted to bear against the end of the socket of the first pipe and a jack whose moving member carries the thrust plate, and the retaining means comprise a yoke which is adapted to engage on the part of the first pipe adjacent the socket thereof and is fixed to the thrust plate so as to provide between the thrust plate and yoke sufficient space to receive the socket of the first pipe.

References Cited in the file of this patent

UNITED STATES PATENTS

| | | |
|---|---|---|
| 409,008 | Breymann | Aug. 13, 1889 |
| 436,914 | Fisher | Sept. 23, 1890 |
| 436,915 | Fisher | Sept. 23, 1890 |
| 947,837 | Miller | Feb. 1, 1910 |
| 1,513,018 | Tracy | Oct. 28, 1924 |
| 1,615,008 | Ferguson | Jan. 18, 1927 |
| 1,877,974 | Robb | Sept. 20, 1932 |
| 2,502,826 | Cohn | Apr. 4, 1950 |
| 2,522,459 | Mitchell | Sept. 12, 1950 |
| 2,535,961 | Schutt | Dec. 26, 1950 |
| 2,588,733 | Knox | Mar. 11, 1952 |